Jan. 26, 1943.  M. F. MOORE  2,309,202
HEATING AND VENTILATING
Filed Nov. 6, 1940  7 Sheets-Sheet 4
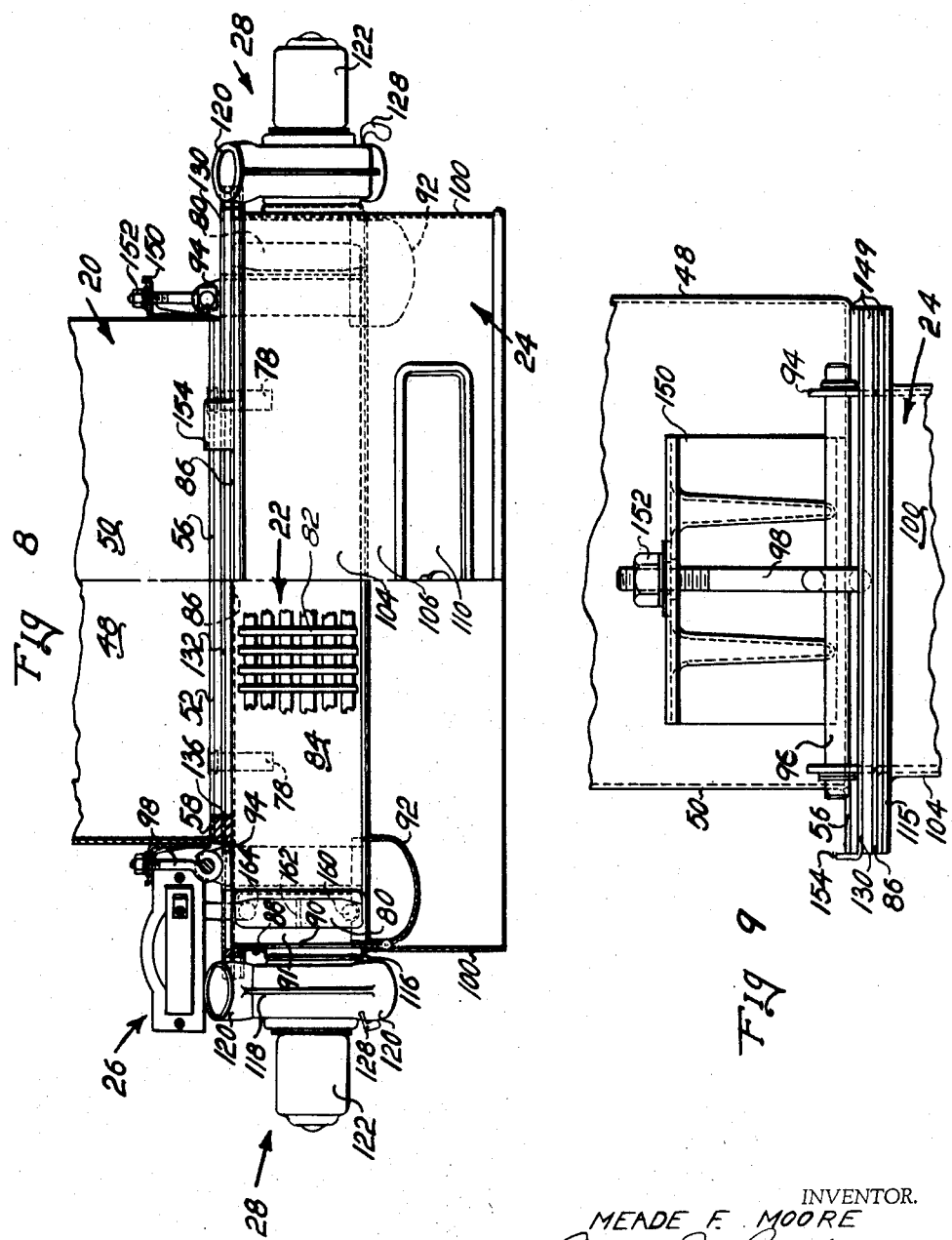
INVENTOR.
MEADE F. MOORE
BY Carl J. Barbee
his attorney

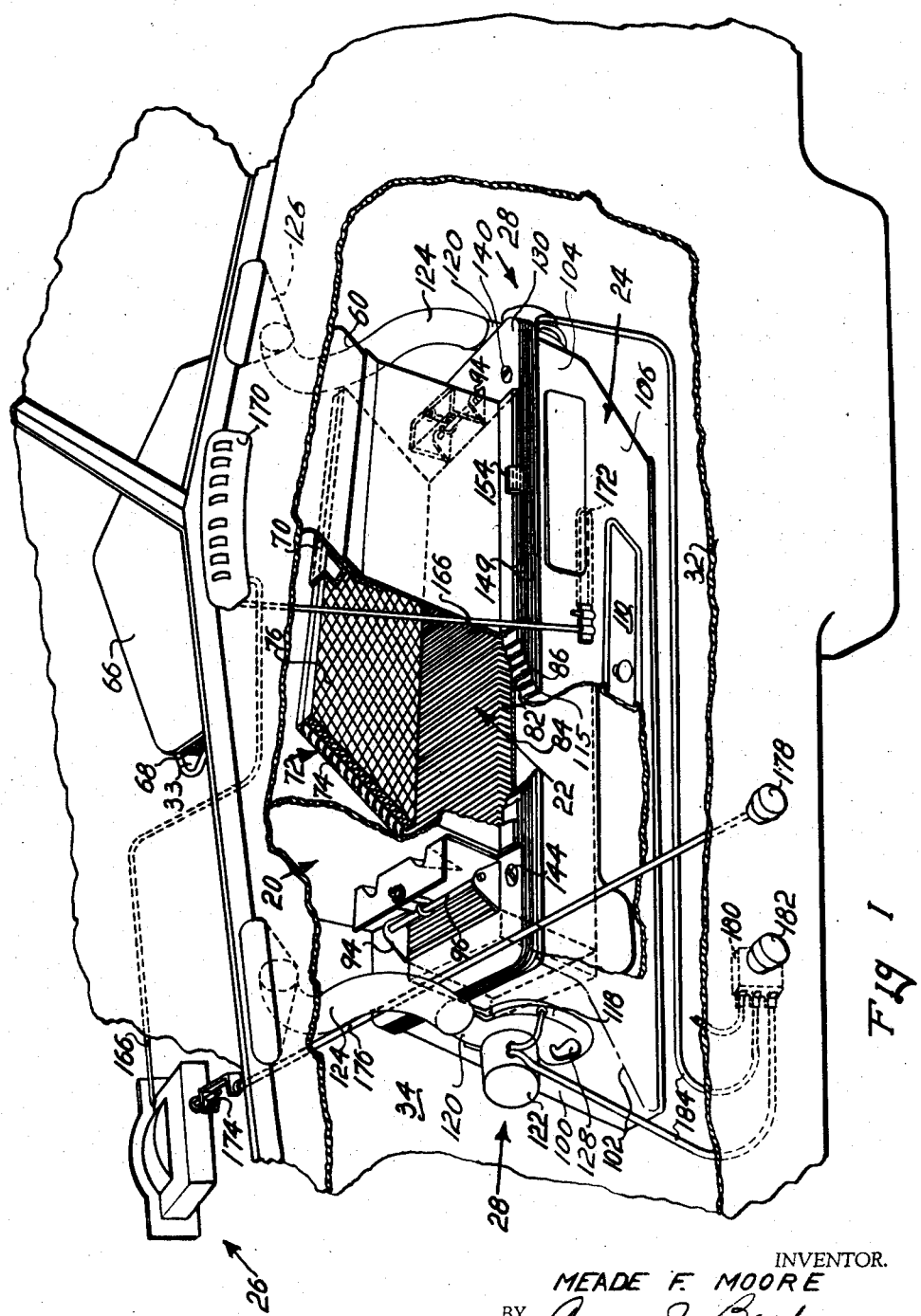

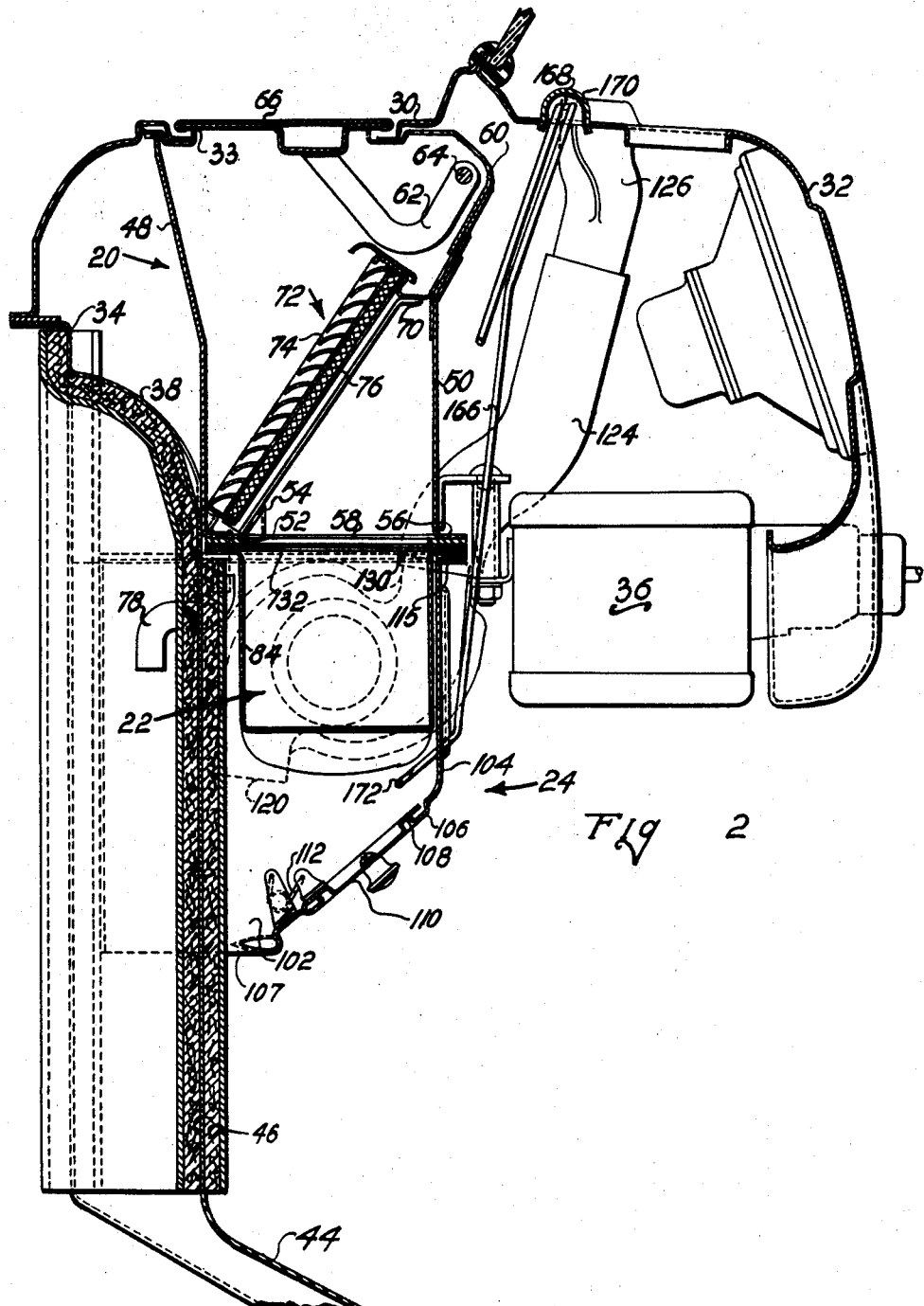

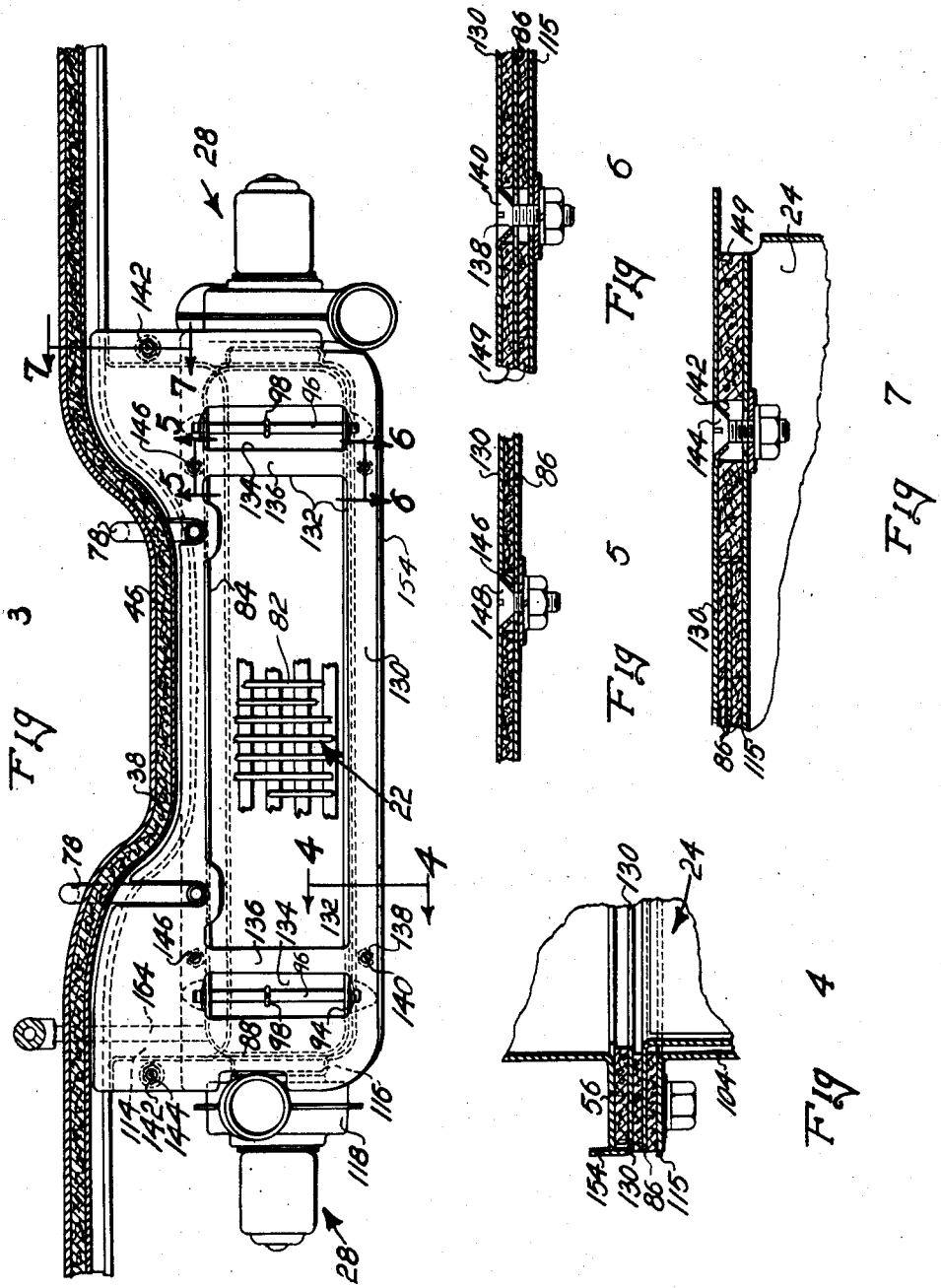

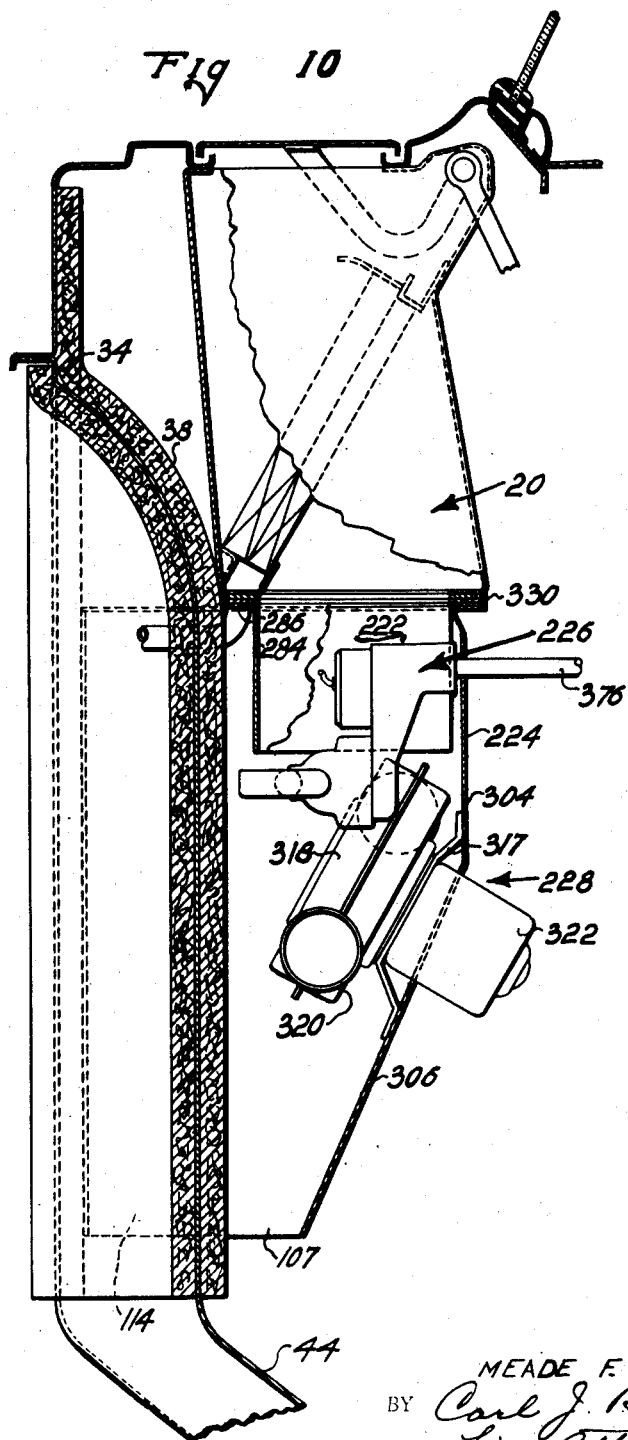

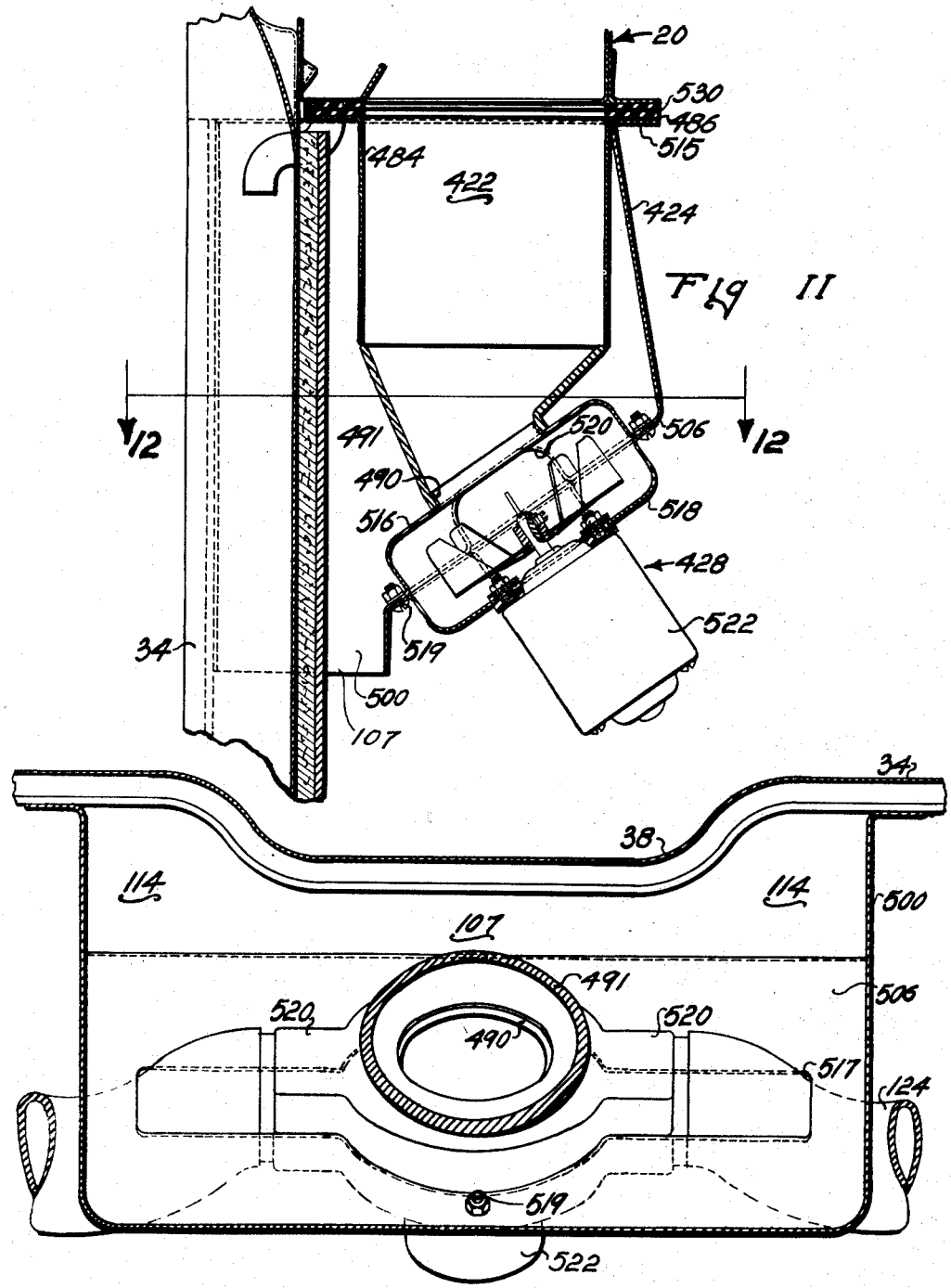

Patented Jan. 26, 1943

2,309,202

UNITED STATES PATENT OFFICE 2,309,202

HEATING AND VENTILATING

Meade F. Moore, Kenosha, Wis., assignor to Nash-Kelvinator Corporation, Kenosha, Wis., a corporation of Maryland Application November 6, 1940, Serial No. 364,485

16 Claims. (Cl. 237—12.3)

This invention relates to heating and ventilating equipment and has particular reference to means for heating and ventilating the interior of an automotive vehicle.

It is an object of this invention to provide a car heater which will more effectively circulate heat through the vehicle.

It is another object of this invention to provide a heater for an automotive vehicle which may be positioned so as not to interfere with the occupants of the vehicle.

It is another object of this invention to provide a heater with novel means for heating fresh air and recirculating part of the air in the vehicle through a portion of the heater.

It is another object of this invention to provide a novel heater assembly which may be installed as a unit in an automobile.

Other objects and advantages of this invention will be apparent from a consideration of the following description and claims and the attached drawings of which there are seven sheets and in which—

Figure 1 represents a broken away, perspective view of the heater as installed in an automobile;

Figure 2 represents a sectional view taken along a vertical plane passed longitudinally through the center of the heater;

Figure 3 represents a plan view showing the heater supporting plate in position in the automobile with the heater unit attached;

Figure 4 represents a sectional view taken along a plane indicated by the lines 4—4 in Figure 3 and looking in the direction of the arrows;

Figure 5 represents a sectional view taken along a plane indicated by the lines 5—5 in Figure 3 and looking in the direction of the arrows;

Figure 6 represents a sectional view taken along a plane indicated by the lines 6—6 in Figure 3 and looking in the direction of the arrows;

Figure 7 represents a sectional view taken along a plane indicated by the lines 7—7 in Figure 3 and looking in the direction of the arrows;

Figure 8 represents a front elevational view partially in section of the heater unit;

Figure 9 represents a side elevation showing the supporting connection of the heater;

Figure 10 represents a vertical longitudinal sectional view through a modified type of heater;

Figure 11 represents a vertical longitudinal sectional view through another modified type of heater;

Figure 12 represents a sectional view taken along a plane indicated by the line 12—12 in Figure 11 and looking in the direction of the arrows;

Figure 13:
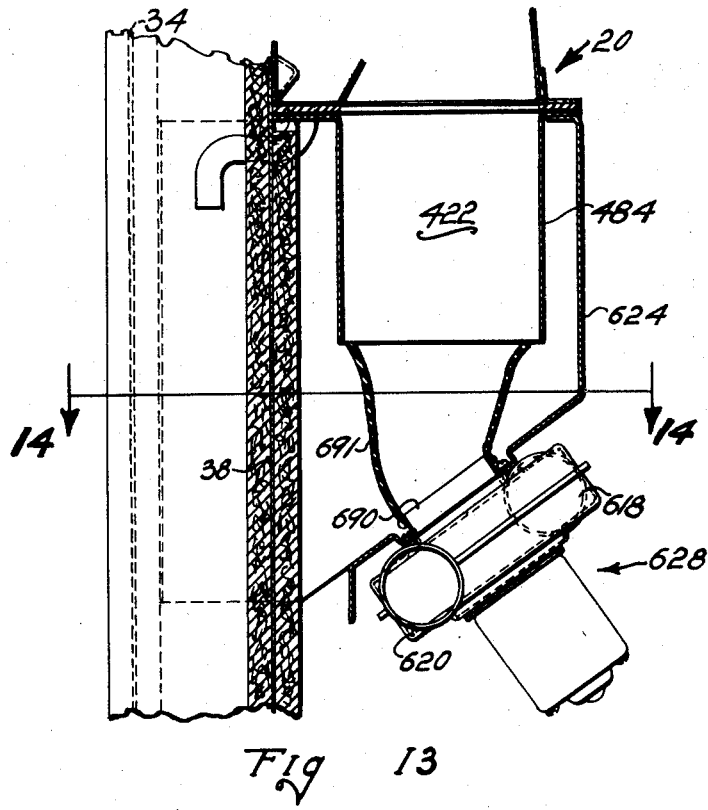
Figure 13 represents a vertical longitudinal sectional view showing another modified type of heater.

Figures 1 through 9 illustrate the preferred form of my invention but are to be taken as an example only and not as a limitation of the invention. In Figures 1 through 9 similar reference characters are used to designate similar parts. The heater shown consists generally of a plenum chamber 20, a heater core 22, a heater shroud 24, a thermostatically controlled valve 26 and blowers 28. The heater is installed below the cowl panel 30 of the automobile and in front of the instrument panel 32. Fresh air is admitted to the heater from outside of the car through an opening 33 in the panel 30. The heater is positioned closely adjacent to the inside surface of the dash panel 34 so as to leave plenty of room to install a radio 36 on the under side of the instrument panel 32. Attention is called to the fact that the dash panel 34 is provided with a rearwardly extending bulge 38 in the center of the automobile which is designed to accommodate the rear end of the motor (not shown). The lower edge of the dash panel 34 is curved backwardly to form the toe board 44. Suitable heat and sound insulating pads 46 are provided on each side of the dash panel 34.

In describing the heater, the parts of the heater positioned adjacent to the dash panel 34 are considered to be the back of the heater, although they are positioned forwardly with respect to the automobile. The surface of the heater presented towards the occupants of the vehicle is considered the front surface. The plenum chamber 20 consists of a hopper box having a back wall 48 and a front wall 50. The back wall 48 is flanged inwardly as at 52 and bent upwardly in an inclined flange 54. The front wall 50 is flanged outwardly towards the front of the heater as indicated at 56. The sides of the hopper box are flanged inwardly as at 58 (see Figure 8). The front wall of the hopper box 50 is inclined forwardly along its top edge as at 60 so as to accommodate a pair of crank arms 62 which are secured to a shaft 64 and support a ventilator cover 66 so that the cover may be raised by rotating the shaft 64. Suitable screening material 68 may be carried by the cover 66 (see Figure 1) to prevent insects from entering the opening 33. A support plate 70 is fastened to the inside of the forward wall 50 near its upper edge and is bent so as to support a filter unit generally indicated at 72. The filter unit consists of a series of rain shedding ribs 74 and a suitable pad of filter material 76 which may be made up of material capable of filtering dust, pollen and other impurities out of the air. Water shed from the ribs 74 collects in the trough formed by the back flanges 52 and 54 and is drained out of the plenum chamber 20 into the motor compartment through a pair of drain hoses 78. The construction of the plenum chamber 20 is more particularly shown and claimed in my co-pending application, Serial Number 255,596, filed February 10, 1939, for Heating, now Patent No. 2,257,638 of Sept. 30, 1941.

The heater core 22 consists of the well known type of construction in which a series of pipes extend between a pair of tanks or headers 80 and support a series of cross fins 82 (see Figure 1). The headers 80 and fins 82 are surrounded by a retaining strip 84 which is outwardly flanged along its upper edge as at 86. The retaining strip 84 extends past the sides of the headers and connects with end walls 88 which are spaced from the headers and defines the apertures 90. An air space 91 is thus left between the headers 80 and the sides of the retaining strip 84. Secured to the lower edges of the retaining strip 84 at the sides thereof are a pair of cup members 92. The cup members 92 open upwardly and cover the bottom of the headers 80 and the air spaces 91 and extend over a portion of the core 22 adjacent to the headers, thus air passed downwardly over the end portions of the core 22 will be redirected upwardly into the air space 91 outside of the headers 80 by the cup members 92. If desired, the retaining strip 84 and cup members 92 may be stamped as a single part. The purpose of cup members will be more particularly described later. The flange 86 of the retaining strip 82 is notched just inside of the headers 80 and bent up to form two pairs of upwardly extending fingers 94 which project upwardly above the core 22 and support a pair of bars 96 around which are bent the hooked screws 98. The screws 98 serve to support the heater unit from the plenum chamber in a manner which will be more particularly described later.

Positioned around the heater core 22 is the heater shroud 24 which has side walls 100 which fit closely adjacent to the side walls 88 of the retaining strip 84 and taper in width toward the bottom and rear of the shroud as is indicated at 102 in Figures 1 and 2. The front wall 104 which connects these end walls 100 thus has a vertical portion and a backwardly sloping portion 106 which is apertured as at 108. The aperture 108 is closed by a door 110 which may be held in either open or closed position by an over-centering coil spring 112. The side walls 100 of the shroud 24 extend from the front of the heater to the inside surface of the dash panel 34 on each side of the bulge 38, while the sloping portion 106 of the front wall 104 extends downwardly to a point adjacent to, but slightly spaced from, the surface of the bulge 38, and just over the toe board 44 (see Figure 2). There is thus defined a horizontal opening 107 which is of narrow width adjacent to the bulge 38 but increases to a large area on each side of the bulge as is indicated at 114 in Figure 3. Air passing downwardly through the heater core 22 into the shroud 24 will be directed downwardly against the toe board 44. While some of this air will pass through the narrow space 107 between the shroud and the bulge, the greater portion of the air will pass out of the sides of the shroud toward the feet of the occupants seated on each side of the vehicle. The top of the shroud 24 is provided with a flange 115 which registers with the flange 86 of the retaining strip 84.

The walls 100 of the shroud 24 are extruded and apertured as at 116 (see Figures 3 and 8) adjacent to the apertures 90 in the retaining band 84 of the heater core. Mounted on the extruded portions 116 at the sides of the shroud 24 is a pair of centrifugal blower units 28 consisting of housings 118 with oppositely directed discharge nozzles 120 and electric motors 122. Attention is called to the fact that blower units 28 at each side of the shroud are identical so that there is no necessity for providing right and left blowers; thus, the upwardly extending nozzle 120 on the left, as viewed in the drawings, is positioned further toward the rear of the heater than the discharge nozzle on the right end of the heater. The upwardly extending discharge nozzles are connected by means of flexible tubes 124 to the defroster nozzles 126 which are arranged to discharge through the instrument panel 32 against the inside of the windshield. The downwardly directed nozzles 120 are arranged to discharge against the feet of the occupants of the vehicle and are provided with dampers 128 which may be closed to force all of the discharge of the blowers against the windshield.

Positioned between the top of the shroud 24 and the bottom of the plenum chamber 20 is a flat supporting plate 130. The plate 130 is provided with a large aperture 132 which is positioned over the open end of the plenum chamber 22. Smaller apertures 134 are positioned at each side of the aperture 132 and are separated therefrom by narrow strips 136 which are positioned underneath the side flanges 58 of the plenum chamber 20. It will be noted that the heater core 22 is longer than the plenum chamber 20 so that the small apertures 134 in the supporting plate 130 will uncover the top of the heater core adjacent to the headers 80 and outside of the plenum chamber 20. The ends of the plate 130 close the top of the air spaces 91. The fingers 94 bent from the retaining strip flange 86 of the heater core also extend upwardly through the smaller apertures 134 in the supporting plate and serve to center the plate on the heater core. The supporting plate is pierced as at 138 along its front edge so that screws 140 may be passed downwardly through the plate, the flanges 86 of the retaining strip 82 and the flange 115 of the shroud 24. The plate is also pierced as at 142 along its sides so that screws 144 may be passed downwardly through the plate and through the flange 115 of the shroud 24 (see Figures 3 and 7). The plate 130 is further pierced as at 146 near its back edge so that screws 148 may be passed downwardly through the plate and the back flange of the retaining band 84 (see Figures 3 and 5). It is thus apparent that the heater core 22 and the shroud 24 are securely fastened to the supporting plate 130 by the screws 140, 144 and 148. Suitable gaskets 149 are provided between the various metal parts. The entire assembly consisting of the heater core, shroud and supporting plate is attached to the plenum chamber 20 by the screws 98 which are passed upwardly through brackets 150 secured to the sides of the plenum chamber. The heater assembly is drawn up tight by means of the nuts 152. A pair of tabs 154 are turned up from the forward edge of the supporting plate 130 which act as locating lugs to position the supporting plate in its proper position relative to the plenum chamber 20, thus the heater assembly may be lifted upwardly against the lower surface of the plenum chamber until the tabs 154 strike the flange 56 of the plenum chamber after which the screws 98 may be fastened to the brackets 150.

Hot water is supplied to the heater core 22 through an intake pipe 160 to the lower portion of the left header 80. The left header is divided by a partition 162 (see Figure 8) and the water leaves the heater core through the discharge pipe 164. Thus the water flows first across the bottom of the core to the right header and then across the top of the core to the left header. The flow of water through the heater core is controlled by the thermostatic valve 26 which is connected between the discharge pipe 164 and the return to the cooling system of the engine. The valve 26 is mounted in an aperture in the dash panel so that all water connections are made in the motor compartment. The valve 26 is of familiar construction and is arranged to open and close according to the pressure of a charge of refrigerant in a capillary tube 166. The tube 166 extends to the front of the plenum chamber 20 and upwardly through the center of the dash panel 32 where it is formed into a coil 168 covered by the perforated shroud 170. From the coil 168 the tube 166 is carried downwardly into the shroud 24 where it is formed into a second coil 172 positioned just below the discharge side of the heater core 22; thus, the control of the valve 26 depends upon an integration of the temperatures existing within the shroud and within the interior of the vehicle which is being heated. The valve 26 is adjustable by means of a shaft 174 (see Figure 1) to determine at what temperature the pressure in the tube 166 will become effective to open the valve 26. The shaft 174 is turned by an operating shaft 176 which extends to the front of the instrument panel 32 and is provided with an operating knob 178. A switch 180 and knob 182 are provided for supplying current to the motors 122 through wires 184 for operating the blower units 28.

The operation of the heater is as follows: When the automobile is in forward motion, fresh air will be forced through the opening 33 in the cowl and through the screen 68 to the plenum chamber 20. In the plenum chamber any rain water will be separated from the air by the ribs 74, and dust will be removed by the filter 76. The clean air will be forced downwardly through the heater core 22 and into the space within the shroud 24. With the door 110 closed, the heated air will be directed downwardly through the opening 107, 114 along the dash panel 34 where it will strike the toe board 44 and flow backwardly along the floor of the car. By discharging the air down along the floor, heated air will be forced underneath the front seat of the car and into the back portion of the car. The natural tendency for hot air to rise operates to heat the upper portions of the car. If a greater proportion of the heated air is desired in the front seat of the car, the door 110 may be opened, allowing the hot air to flow directly into the front compartment. The flow of air just described is all caused by the motion of the vehicle scooping air through the opening 33. Should it be desired to heat the vehicle while it is standing, the defroster blower units 28 may be set in operation by closing the switch 180. Attention is called to the fact that air passing through the blower units 28 is drawn from the air space 91 between the sides of the heater core retaining strip 84 and the sides of the headers 80. The air reaches this space by passing downwardly through the small apertures 134 in the supporting plate 130, which, it will be noted, are outside of the plenum chamber 20, and downwardly through the side portions of the core 22 and through the cupped members 92. Thus, the air circulated by the blower units is what is known as recirculated air, since it is drawn from within the vehicle and again passed through a portion of the heater core. After the heater has been in operation for some time, the air within the vehicle will naturally be warmer than outside air so that the recirculated air will attain a considerably higher temperature than that of the fresh air entering the main part of the heater core. This is a distinct advantage, since it provides a supply of very warm air to the defroster nozzles 126 where the air will be most effective in melting ice and frost from the windshield. As was described above, the blower units 28 may be adjusted by means of the dampers 128 to discharge part of this recirculated air against the feet of the occupants of the front seat.

Considering the modification of the invention shown in Figure 10, reference characters have been used which are nearly as possible two hundred larger than the corresponding parts shown in Figures 1 through 9. Parts of the heater which have not been changed from the embodiment shown in Figures 1 through 9 have been given the same number. In Figure 10 the heater core 222 is provided with a retaining strip 284 which is outwardly flanged as at 286 and is secured to a supporting plate 330. The heater core 222 is, however, shorter than the core 22 and does not extend beyond the sides of the plenum chamber 20 which is the same as that shown in the preferred form of the invention. The heater core 222 is surrounded by a shroud 224 which extends downwardly at 304 along the front and sides of the heater core and around the bulge 38 in the dash panel 34 and tapers toward the dash panel 34 as at 306 to a point spaced just above the toe board 44 and just forwardly of the dash panel 34. Air discharged from the heater core 222 is thus directed downwardly against the toe boards 44 through a narrow passage 107 in the center of the automobile and through two wider passages 114 at each side of the bulge 38.

The shroud 224 supports a bracket 317 on which is mounted a single blower unit 228. The housing 318 of the blower unit is positioned within the casing 224 so as to draw air from beneath the heater core 222. The motor 322 projects through the front surface of the shroud 224, while the discharge tubes 320 extend towards the sides of the shroud and are connected to flexible tubes (not shown) which are passed through the side walls of the shroud and connected to defroster nozzles.

A thermostatically controlled valve 226 is also mounted within the shroud 224 for controlling the flow of hot water through the core 222 in the same manner in which the valve 26 controls the core 22. A control shaft 376 for adjusting the valve projects forwardly through the shroud.

This form of the invention may be easily assembled by attaching the heater core and shroud to the supporting plate and securing the blower unit and valve to the shroud. The entire unit may be then installed by securing the supporting plate 330 to the bottom of the plenum chamber 20. The heater functions to discharge a blast of heated air downwardly against the toe boards of the automobile from where it flows backwardly and upwardly to the entire automobile as in the preferred form of the invention. While there is no provision for recirculating part of the air against the feet of the occupants when the car is not in motion, the heater requires only one blower unit and motor.

Considering the form of the invention illustrated in Figures 11 and 12, reference characters have been used which insofar as is possible are four hundred greater than the corresponding parts shown in Figures 1 through 9. Parts which have not been changed from the form shown in Figures 1 to 9 bear the same reference number as in Figures 1 to 9. The heater unit consists of a core 422 retained in a retaining strip 484 which is flanged along its upper edge as at 486 and secured to a supporting plate 530 and the upper flange 515 of the shroud 424. The shroud 424 has a front surface 506 which slopes sharply toward the dash panel 34 and is stamped upwardly as at 516 to form the upper part of the blower housing 518. The upper portion of the housing is provided with a flanged opening 490 around which is secured a conical nozzle 491 which extends upwardly and covers a portion of the bottom of the heater core 422. Thus, the blower unit 428 withdrawns some of the heated air directly from the heater core and discharges it through transversely extending passages 520 which are connected to flexible tubes 124 for conducting the heated air to defroster nozzles. The tubes 124 are partially received within the shroud 424 by passing them through slots 517 in the front surface 506 of the shroud. The motor 522 is bolted to the lower half of the blower housing 518 which is in turn secured to the shroud by the nuts 519.

The side walls 500 of the shroud 424 extend to the dash panel 34 on each side of the bulge 38, while the sloping front surface 506 extends to within a short distance of the front surface of the bulge, thus defining a discharge passage which is narrow in the center as at 107 and wide at each side as at 114 similar to that shown in the previous forms of the invention.

Figure 14:
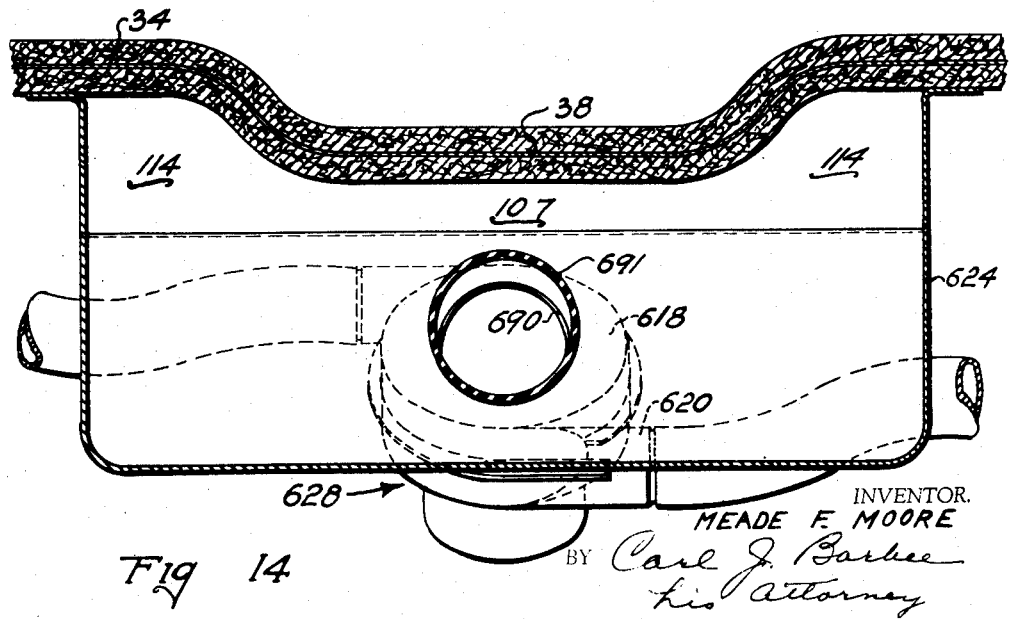
Figure 14 represents a sectional view taken along a plane indicated by the line 14—14 in Figure 13 and looking in the direction of the arrows.

The modification of the invention shown in Figures 13 and 14 are practically identical with that shown in Figures 11 and 12 with the exception that the blower unit 628 is provided with a complete blower housing 618 which is secured to the under side of the sloping front surface of the shroud 624. As a result, the discharge tubes 620 are located outside of the shroud 624 where the tubes may easily be attached to them for conducting heated air to the defroster nozzles. The cone-shaped nozzle 691 which directs hot air from the core 422 to the blower unit is shown to be made of rubber or some similar flexible material so that it may be easily slipped over the intake end 690 of the blower housing 618.

While I have described my invention in some detail, I intend this description of the preferred form and the modified forms to be examples only, and not as limitations of my invention to which I make the following claims.

I claim:

1. In an automobile, a box-like plenum chamber means open on its under side, a supporting plate defining a large aperture and a pair of smaller apertures, a heater core secured to said supporting plate below said apertures, cupped members carried under the ends of said core and extending beyond the ends thereof, a shroud secured to said supporting plate and surrounding said heater core and said cupped members, said shroud defining openings communicating with the interior of said cupped members, blower units carried by said shroud and arranged to draw air through the openings in said shroud from said cupped members, and means for securing said supporting plate to the under side of said plenum chamber means, the large aperture in said supporting plate registering with the under side of said plenum chamber means, and the smaller apertures in said supporting plate being positioned outside of said plenum chamber means.

2. In an automobile, a box-like plenum chamber means open on two sides, a supporting plate defining a large aperture and a pair of smaller apertures, a heater core secured to said supporting plate below said apertures, cupped members carried under the ends of said core and extending beyond the ends thereof, a shroud secured to said supporting plate and surrounding said heater core and said cupped members, said shroud defining openings communicating with the interior of said cupped members, blower units carried by said shroud and arranged to draw air through the openings in said shroud, and means for securing said supporting plate to the under side of said plenum chamber means, the large aperture in said supporting plate registering with the under side of said plenum chamber means, and the smaller apertures in said supporting plate being positioned outside of said plenum chamber means, said shroud defining an opening along its lower surface.

3. In an automobile having a dash panel with a bulge in the center thereof, filter chamber means, a heater core supported beneath said filter chamber means, and a shroud positioned around said heater core, the sides of said shroud extending to said dash panel on each side of said bulge, said shroud being open at the bottom thereof to define a discharge passage which is narrow in the center of said bulge and wider at each side thereof.

4. In an automobile having fresh air filter chamber means, a heater core supported by said filter chamber means and arranged to receive air from said filter chamber, said core having a portion projecting beyond the side of said filter chamber means, a shroud supported by said heater core, said shroud being arranged to direct the flow of air passing through said core to a point just over the floor of said automobile, means secured to said core below that portion of the core which extends beyond said filter chamber means for directing air passing through said last mentioned portion of said core to a blower unit, and a blower unit supported by said shroud.

5. In an automobile having a dash panel and a cowl panel defining an air intake, a filter chamber supported on the under side of said cowl panel, a heater core secured to the under side of said filter chamber, a shroud supported around said core and having end walls extending to said dash panel, said end walls tapering in width below said heater core, a front wall for said shroud connecting the tapered portions of said end walls and terminating in a lower edge spaced from said dash panel, said front wall defining an aperture, and a door for closing said aperture.

6. In an automobile having a dash panel with a bulge in the center thereof, a heater core extending transversely of said automobile and positioned adjacent to the bulge in said dash panel, and a shroud supported around said heater core, the side walls of said shroud extending to said dash panel, the front wall of said shroud sloping towards said dash panel, said shroud and said dash panel defining an opening just over the floor of said automobile, said opening being narrow in the center and wider at each end.

7. In an automobile having a dash panel connected to a floor board, a bulge formed in the center of said dash panel, a shroud positioned adjacent to the inside surface of said dash panel just over said floor board and around said bulge, said dash panel and said shroud defining an opening adjacent to said floor board, a heater unit positioned in said shroud and arranged to discharge downwardly into said shroud, and means for directing a flow of air from the outside of said automobile through said heater.

8. In an automobile having a dash panel with a cowl panel attached to the upper edge thereof, filter chamber means supported below said cowl panel and adjacent to said dash panel, a heater core positioned below said filter chamber means and extending beyond the sides thereof, a shroud positioned around said heater core and extending to said dash panel, said shroud and dash panel defining an opening near the floor of the automobile, a pair of blower units for directing streams of air against the windshield of the automobile, and means attached to said heater core for directing air past through the portions of said core extending beyond said filter chamber means to said blower units.

9. In an automobile having a dash panel with a cowl panel attached to the upper edge thereof, filter chamber means supported below said cowl panel and adjacent to said dash panel, a heater core positioned below said filter chamber means and extending beyond the sides thereof, a shroud positioned around said heater core and extending to said dash panel, said shroud and dash panel defining an opening near the floor of the automobile, a pair of blower units for directing streams of air against the windshield of the automobile, and means attached to said heater core for directing air past through the portions of said core extending beyond said filter chamber means to said blower units, said blower units having closeable openings arranged to direct streams of air against the floor of the automobile.

10. In an automobile, filter chamber means arranged to receive air from the outside of the automobile and defining an outlet opening, a heater core having a portion arranged in the path of the air issuing from said opening, a portion of said heater core positioned outside of the path of the air issuing from said opening to receive air from the inside of said automobile, a shroud positioned around said heater core and arranged to direct the outside air passing through said heater along the floor of the automobile, means secured to said shroud for positively circulating air from the inside of the vehicle through the second mentioned portion of said heater core and delivering the last mentioned air to the windshield of the automobile, and means for supporting said heater core and shroud from said filter chamber means.

11. In an automobile, means forming a filter chamber arranged to receive air from outside of the automobile and opening into said automobile, a heater core having a retaining strip formed therearound, an out turned flange formed around the top of said retaining strip, a pair of ears turned up from each side of said flange, a supporting plate defining a main opening registering with the outlet of said filter chamber and a pair of auxiliary openings at each side of said main opening positioned over said heater core, said ears projecting through said auxiliary openings, means securing the flange of said retaining strip to said supporting plate, a shroud positioned around said heater core and having a flange on the top thereof, means securing the flange on said shroud to said supporting plate, and means for removably fastening said pairs of ears to said means forming filter chamber.

12. In an automobile, means forming a filter chamber opening into said automobile and arranged to receive air from outside of the automobile, a heater core having a retaining strip formed therearound, an out turned flange formed around the top of said retaining strip, a pair of ears turned up from each side of said flange, a supporting plate defining a main opening registering with the outlet of said filter chamber and a pair of auxiliary openings at each side of said main opening positioned over said heater core, said ears projecting through said auxiliary openings, means securing the flange of said retaining strip to said supporting plate, a shroud positioned around said heater core and having a flange on the top thereof, means securing the flange on said shroud to said supporting plate, means for removably fastening said pairs of ears to said filter chamber forming means, and means supported by said shroud for drawing air from the interior of the automobile through said auxiliary openings and a portion of said heater core and delivering the air against the windshield of the automobile.

13. In an automobile having a dash panel, a heater positioned adjacent to said dash panel, a shroud positioned around said heater and forming with said dash panel a heater chamber having an opening directed against the floor of the automobile, the front wall of said shroud sloping towards said dash panel below said core, and a blower unit supported by said front wall and arranged to draw air from within said heater chamber and deliver it against the windshield of the automobile.

14. In an automobile having a dash panel, a heater positioned adjacent to said dash panel, a shroud positioned around said heater and forming with said dash panel a heater chamber having an opening directed against the floor of the automobile, the front wall of said shroud sloping towards said dash panel below said core, and a blower unit supported by said front wall and arranged to draw air from within said heater chamber and deliver it against the windshield of the automobile, a portion of said blower unit being formed by stamping the front wall of said shroud to form part of the blower casing.

15. In an automobile having a dash panel, a heater positioned adjacent to said dash panel, a shroud positioned around said heater and forming with said dash panel a heater chamber having an opening directed against the floor of the automobile, the front wall of said shroud sloping towards said dash panel below said core, a blower unit supported by said front wall and arranged to draw air from within said heater chamber and deliver it against the windshield of the automobile, and an intake spout extending from said blower unit to the underside of said heater and covering a portion thereof.

16. In an automobile having a generally vertical dash panel connected to a floor board, a bulge formed in the lower portion of said dash panel in the center thereof and extending to the passenger compartment of said automobile, a heater unit supported in said automobile above said bulge, a shroud positioned around said heater unit, said shroud having side walls extending to said dash panel on each side of said bulge, said side walls tapering downwardly toward said dash panel below said heater unit, and a front wall joining said tapered side walls, said front wall terminating in an edge closely spaced with respect to the inner surface of said bulge.

MEADE F. MOORE.